Nov. 11, 1947.  A. J. CORMIER  2,430,454
WATER CHEST RACK FOR A MACHINE GUN MOUNT
Filed March 21, 1945
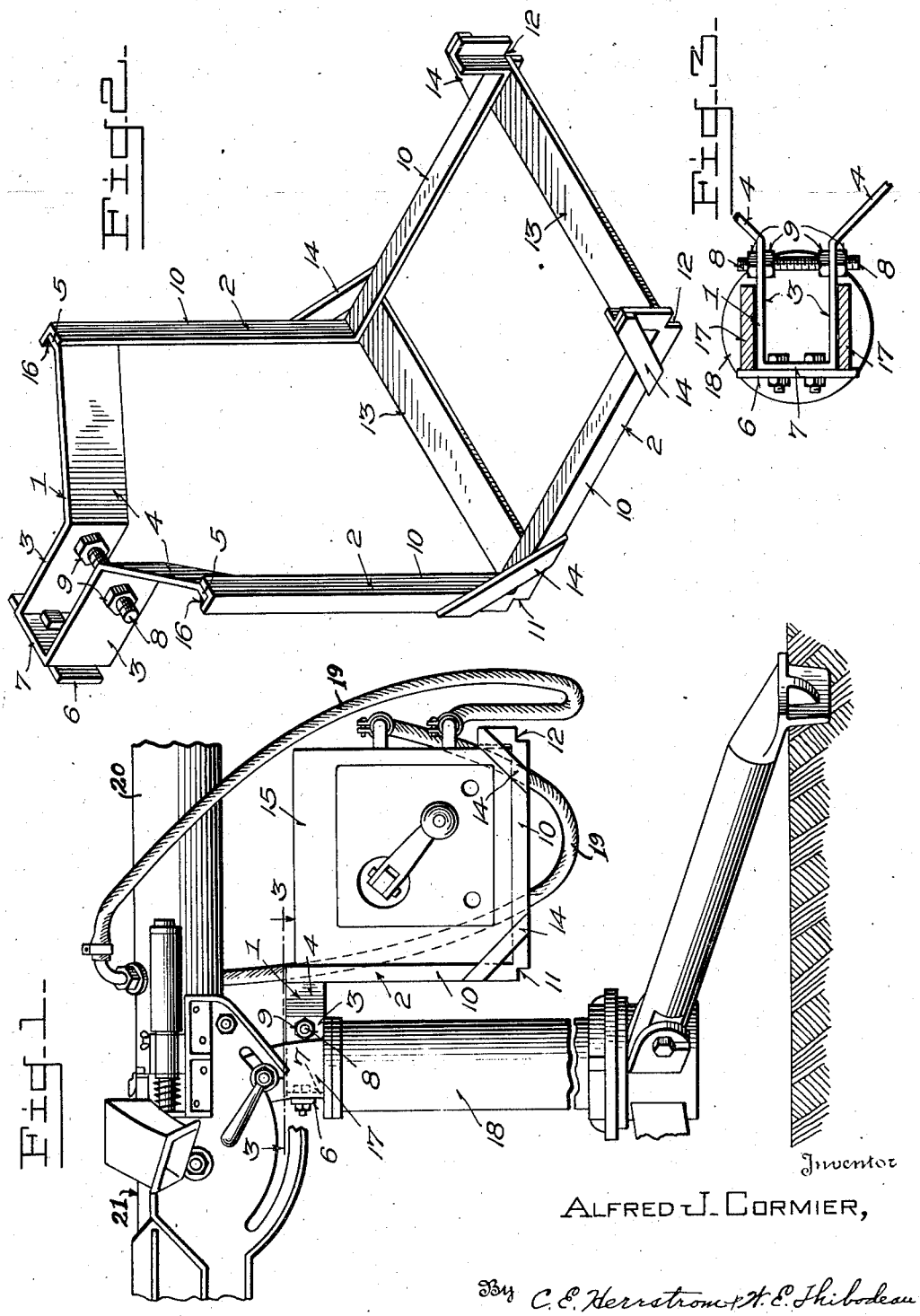
Inventor
ALFRED J. CORMIER,
By C. E. Herrstrom & W. E. Thibodeau
Attorneys Patented Nov. 11, 1947

2,430,454

UNITED STATES PATENT OFFICE 2,430,454

WATER CHEST RACK FOR A MACHINE GUN MOUNT

Alfred J. Cormier, Bellflower, Calif.

Application March 21, 1945, Serial No. 584,027

1 Claim. (Cl. 89—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to a revolving bracket or rack and more particularly relates to a rack for a revolving water chest on a machine gun mount.

It has been necessary heretofore to set water chests for a machine gun on the ground and connect them to the water jacket with a considerable length of hose. It is not possible to rotate the machine gun 360 degrees with this type of connection. The hose is continually stepped upon by the operators of the machine gun. The remote position of the water chest makes it difficult to operate on many occasions. Hose connecting the water chest and the water jacket of the gun wears out very quickly in prior devices.

It is, accordingly, an object of my invention to overcome the above and other defects in mounting means for a water chest for a machine gun and it is more particularly an object of my invention to provide a bracket for the water chest of a machine gun which will revolve with the mount therefor and which is simple in construction, economical in cost, easy to assemble, and easy to operate.

Another object of my invention is to provide a bracket which fits into the yoke of the mount for a machine gun without screws or bolts.

Another object of my invention is to provide a bracket for a machine gun whereby the assistant gunner can always be in a position to operate the pump on the water chest, change ammunition, or clear cartridges.

Another object of my invention is to provide a bracket for mounting a water chest wherein the hose from the water chest to the water jacket of the gun is kept off the ground.

Another object of my invention is to provide a bracket for mounting a machine gun which will permit connection of the water chest and the water jacket of the gun without dragging the hose during 360 degree operation.

Another object of my invention is to provide a bracket for the water chest of a machine gun which permits 360 degree operation of the machine gun.

Other objects of my invention will become evident from the following detailed description, taken in conjunction with the accompanying drawings, in which:

Figure 1 is a side elevational view of my novel bracket for a water chest mounted on a machine gun mount;

Figure 2 is a perspective view of my novel bracket;

Figure 3 is a view taken on the line 3—3 of Figure 1.

Referring now to the drawings, Figure 2 shows a supporting member 1 and a basket member 2. The supporting member 1 comprises a flat strip bent to form spaced parallel sides 3 and angularly outwardly extending members 4. The members 4 are offset at 5. A locking plate 6 is bolted to the base 7 of the supporting bracket 1. A locking bolt 8 is spaced from the locking plate 6 and has engaging nuts 9.

The basket member 2 comprises angle irons 10 cut at 11 and 12 and bent at right angles at these points. Cross members 13 connect the angle irons 10 together and brace members 14 are added to strengthen the basket member 2. The basket member 2 is built of a size to accommodate a water chest 15 of conventional design for a machine gun. The water chest 15 is connected in the usual manner by suitable hose connections 19 with the water jacket 20 of the machine gun 21 which is mounted on the yoke 17. The offset portions 5 on the supporting members 1 are welded to the angle irons 10 at 16.

Figure 1 shows the parallel sides 3 of the supporting member 1 disposed between the upstanding yoke 17 of the machine gun mount pedestal 18. The locking plate 6 and the bolt 8 are spaced a distance equal to the width of the yoke 17. The parallel sides 3 of the support member 1 are placed in the yoke member 17 as shown in Figure 1 before the machine gun is mounted in the yoke 17.

It will be evident from the foregoing that I have provided a novel bracket for a water chest for a machine gun which permits 360 degree rotation of the machine gun, prevents hose entanglements, permits easy operation by the assistant gunner, and saves hose from wear.

Various changes may be made in the specific embodiment of my present invention without departing from the spirit thereof, or from the scope of the appended claim.

It should be understood that the yoke 17 is part of a pintle device revoluble on the top of the pedestal 18, and comprises two upstanding side plates curved rearwardly to carry the trunnions of the cradle of the gun. Between these plates of the yoke spaced above the base of the yoke a distance a clamp bolt sleeve, not shown, is extended between these plates, and it is necessary that the width of the strap stock from which the supporting member 1 is formed should be less than the space between the base plate of the yoke and the sleeve mentioned. The arms 4 diverge and extend forwardly so that the offsets 5 are located in a vertical plane which is spaced forwardly of the pedestal 18, so that the basket 2 suspended therefrom may have its rear members dependent therefrom and support the water chest clear of the pedestal.

The plates 3 of the support member are spaced so as to fit snugly between the side plates of the yoke 17 and are of a length such that the base portion 7 may lie flush with the rear edges of the side plates of the yoke, while the forward parts of the side plates extend to the forward edge of the base of the yoke. The bolt 8 and its nuts 9 are located between the bases of the divergent arms 4 and the forward edges of the side plates of the yoke 17 so that the outer nuts 9 may be turned while the device is in place. The basket and supporting member may be set in place upon the mount without necessarily removing the gun, by simply detaching the lock plate 6 while the U-shaped parts 3 and 7 are inserted between the side plates of the yoke from the front, the outer nuts 9 being first backed off, and the inner nuts 9 screwed inwardly toward each other so as to leave the side plates 3 free to yield to the side plates of the yoke 17 and assure easy emplacement of the device. After insertion of the parts 3 and 7 in the yoke 17, the locking plate 6 is introduced against the rear edges of the side plates of the yoke and secured to the base part 7 by the bolts shown. Thereafter, the supporting member is drawn forwardly so that the plate 6 presses firmly against the rear edges of the yoke 17, with the lower edges of the plates 3 resting snugly upon the base of the yoke 17 between the side plates of the latter, and while so positioned the inner nuts 9 are screwed outwardly and against the plates 3 so as to press these plates tightly against the side plates of the yoke 17, by which means the support 1 is fixed rigidly on the yoke 17 in the position shown in Figure 1. Thereafter, the outer nuts 9 may be tightened to secure the parts against accidental loosening.

In the forming of the basket, the cuts 11 and 12 are simple slots or kerfs in one flange of each of the pieces 10, the other flange being bent in the forming of the piece, as shown in Figure 2 and the brace members 14 then applied, the latter serving to hold the water chest against lateral displacement from the basket while the upturned short front members of the basket hold the chest against forward displacement.

What I claim is:

In a combination of the type comprising a machine gun mount having a yoke, and a bracket for a coolant reservoir carried by the mount for traverse therewith, the improvement comprising a supporting element for the bracket of U-shape inserted through the yoke, a plate member detachably secured across and overhanging the base of the U to retain the element in the yoke, means at the top of the U and astride the opposite side of the yoke for expanding the sides of the U against the yoke, diverging arms from the top of the U and a basket depending therefrom.

ALFRED J. CORMIER.

REFERENCES CITED

The following references are of record in the file of this patent:

UNITED STATES PATENTS

| Number | Name | Date |
| --- | --- | --- |
| 760,634 | Lanpher | May 24, 1904 |
| 1,594,365 | Haubroe | Aug. 3, 1926 |
| 1,006,513 | Tyreman | Oct. 24, 1911 |
| 1,911,380 | McFarlin | May 30, 1933 |
| 2,116,576 | Hormann | May 10, 1938 |
| 2,279,442 | Burns et al. | Apr. 14, 1942 |
| 2,362,012 | Kendall et al. | Nov. 7, 1944 |
| 1,337,971 | Watkins | Apr. 20, 1920 |
| 2,378,191 | Corte | June 12, 1945 |
| 2,186,026 | Joyce | Jan. 9, 1940 |